United States Patent
Dusek

[15] 3,699,874
[45] Oct. 24, 1972

[54] POPCORN POPPER
[72] Inventor: Ervin F. Dusek, Villa Park, Ill.
[73] Assignee: Reliable Manufacturing Corporation, Franklin Park, Ill.
[22] Filed: Nov. 20, 1970
[21] Appl. No.: 91,460

[52] U.S. Cl. .................................................99/238.1
[51] Int. Cl. ..................................................A23l 1/18
[58] Field of Search ....................99/238.1; 219/439

[56] References Cited
UNITED STATES PATENTS
3,611,910  10/1971  Hughes ................99/238.1

Primary Examiner—Billy J. Wilhite
Attorney—Morris Spector

[57] ABSTRACT

An improved popcorn popper having an improved insulating means which facilitates more uniform heating while reducing heat losses. Assembly of the heating element as an integral unit into the base is also facilitated.

10 Claims, 3 Drawing Figures

PATENTED OCT 24 1972
3,699,874
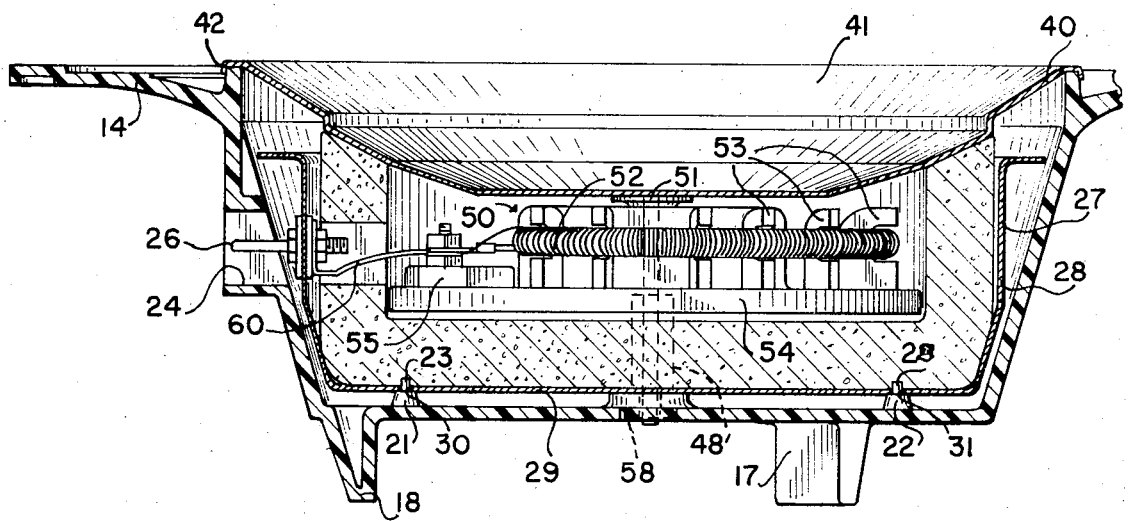
INVENTOR
ERVIN F. DUSEK
BY Morris Spector
ATT'Y.

POPCORN POPPER

This invention relates to improvements in popcorn poppers in general and, more specifically, to a new and improved insulating arrangement which provides for better popping through a reduction in heat losses.

Popcorn poppers of the type which are inverted after the corn has been popped to permit the container or cover to hold the popcorn during consumption are old in the art. In such types, the base oftentimes becomes too hot for easy handling during the inverting procedure.

The present invention is directed to a new and improved insulating and heating element mounting arrangement which achieves better heat distribution and insulates the base against significant heat transmittal and which retains it's heat insulating properties after long and repeated usage of the popper.

It is an object of this invention to provide a new and improved popcorn popper having better and improved heat transfer characteristics.

It is a further object of this invention to provide a new and improved popcorn popper having a novel insulating and heating element mounting arrangement which is easily manufactured and assembled and will not appreciably change over a long period of time.

It is a further object of this invention to provide a new and improved popcorn popper having a novel insulating means which prevents the base from becoming unduly heated during popping of the corn.

It is a still further object of this invention to provide a new and improved mounting arrangement for an insulating means and heating element in a corn popper.

Objects in addition to those specifically set forth will become apparent upon reference to the accompanying drawings and following description.

IN THE DRAWINGS:

FIG. 1 is a perspective view of the popcorn popper of the present invention;

FIG. 2 is an enlarged fragmentary cross-sectional view taken generally along line 2—2 of FIG. 1 with the container omitted; and FIG. 3 is a cross-sectional view taken generally along line 3—3 of FIG. 1 with the container omitted.

In FIG. 1, 10 illustrates a popcorn popper of the invertible type consisting of a cover or container 11 that rests on a base 12. The container 11 is preferably formed of a clear thermoplastic and may be of a capacity of several quarts. Popcorn may be popped within the container 11, then the entire assembly is inverted and then the base 12 is removed to permit access to the popcorn in the container 11, as is well known. A pair of oppositely directed handles 13 and 14, which are recessed, receive complementary handles 15 and 16 on the container 11.

The base 12 may be formed of phenolic material such as "Bakelite" or the equivalent. It is a unitary one-piece, cup shaped, molded design having supporting feet 17, 18 and 20 (FIG. 3) and includes a pair of upstanding lugs 21 and 22 which have integral upstanding centering pins 23—23 of reduced diameter at their upper ends. An opening 24 is formed in one side of the base 12 to receive a female plug 25 of an electric cord set of known type. Terminal pins 26 (only one shown) extend into the opening 24 being mounted on a rigid metal cup 27, which is a heat reflector and has a circular rim at it's upper end for that purpose.

The cup 27 is of annular construction having a side wall 28 and a bottom 29, the latter having centering openings 30 and 31 sized and located to receive the pins 23 for centering the cup with respect to the base 12. The cup 27 has additional openings 32 and 33 in the base, which are in alignment with countersunk openings 34 and 35 in the base when the reflector is centered by the pins 23 in the openings 30–31.

A shallow circular pan or receptacle 40 with an upwardly facing cooking surface 41 and an outer flange 42 tops the base 12.

The cup 27 receives an insulating member 43 which is also of general cup-shaped design having a frustoconical surface 44 at its upper marginal edge on which the underside of the receptacle 40 seats. This inhibits convection air currents across the top of the insulating member 43. The insulating member 43 is formed of ceramic refractory material which has excellent heat insulating qualities. It is relatively soft, light weight and rather fragile.

As shown in FIG. 3, the insulating member 43 has a pair of openings 45 which receive supporting sleeves 47 and 48, of metal. The upper ends of the sleeves 47 and 48 engage and support a heating unit 50, a known type, having a thermostat 51 at its center and an helically wound heating coil element 52 disposed in a circle around ceramic insulating fingers 53 on a metal base member 54 which also serves as a reflector to direct the heat from the heating coil towards the underside of the cooking surface 41. One end of the heating coil 52 is electrically connected to a ceramic terminal block 55 (FIG. 2) mounted on the base 54. A conductor 60 connects the end of the heating coil 52 to one pin terminal 26 with a similar arrangement provided for connecting the other terminal pin 26 to one terminal of the thermostat, the opposite terminal of which is connected to the opposite end of the heating coil 52, thus connecting the thermostat in series with the heating coil. The insulating member 43 is of material which, while shape-sustaining, is unable to resist loads of any appreciable magnitude in compression and, therefore, sleeves 47 and 48 are provided to support the heating means 50 directly from the metal member 27 which in turn is supported directly from the base 12 and slightly spaced from the insulating member 43. The insulating member 43 is of a thickness sufficient to provide the requisite heat insulation.

The pan 40 has a pair of threaded pins or studs 55' and 56 riveted or otherwise attached to its underside. These are of sufficient length to extend through the sleeves 47 and 48 and openings 34 and 35, where nuts 57 and 58 clamp the receptacle 40 tightly to the housing and simultaneously bring the underside into engagement with the thermostat 51. The base 54 is thus forced against the sleeves 47 and 48 and transmits the supporting forces to the cup 27, relieving the member 43 of those forces.

From the foregoing, it can be observed that the heating means is substantially enveloped by the insulating member 43 with the exception of the top which is covered by the receptacle 40 which receives the corn to be popped. The insulating member 43 is protected on its outer margin by the cup 27 which may be formed by spinning lightweight metal such as aluminum or the like. With the upper margin of the insulating member 43 engaging the underside of the cooking surface 41, the heat of the heating element 52 is confined to the area within the cup-shaped insulating member and ultimately finds its way to the underside of the cooking surface 40 aided by the reflective quality of the insulating member 43 and reflector 54 and reflection of the cup 27 at its upper end. Accordingly, considerable improvement in the heat transfer and uniformity of popping is achieved while reducing the heat losses to the base 12.

In compliance with the requirements of the patent statutes, I have herein shown and described preferred embodiment of the present invention. It is understood that this is merely illustrative of the principles of the invention.

What is considered new and desired to be secured by Letters Patent is:

1. A popcorn popper of the type comprising a base terminating at its top in a shallow pan for receiving corn to be popped, and having an inverted container covering said pan for confining the popped corn, said container resting on said base and being removable therefrom so that after the corn has been popped the base and the covering container may be inverted and separated from one another to leave the popped corn in the container, and an electric heater is in the base for heating the corn to be popped, characterized in that there are means for mounting the heater comprising a cup shaped member, a preformed porous insulator in the cup member and surrounding the sides and bottom of the heater, and support means supporting the heater and the cup member in the base independently of the porous insulator.

2. A structure of claim 1 wherein the insulator and the pan substantially encase the space within which the heater is located to inhibit convection of heated air from said space.

3. A structure of claim 1 wherein the cup shaped member has an electric terminal mounted thereon and electrically connected to the heater and which includes a pair of terminal prongs for receiving an electric plug, said base having an opening into which the prongs extend and the walls of which opening surround and are spaced from the prongs to permit access of an electric plug to the prongs.

4. A structure of claim 3, wherein the pan is secured to the base by clamping means passing through the heater, and the insulator and the cup shaped member.

5. A structure of claim 4 wherein the heater support means include upstanding lugs on the inside of the base to support the cup shaped member with its bottom spaced from the bottom inner surface of the base.

6. A structure of claim 4 wherein the pan clamping means also holds the cup shaped member and the heater against separation from said support means.

7. A structure of claim 3 wherein the base is of molded insulating material.

8. A structure as defined in claim 1 wherein the cup shaped member is elevated from the inside bottom of the base to provide an air space insulation there between.

9. A structure as defined in claim 1 wherein the porous insulation is a fragile preformed ceramic refractory cup.

10. A structure as defined in claim 1 further characterized in that the insulator includes a surrounding wall that defines a space in which the heater is located, and that said shallow pan closes the open top of that space to inhibit convection air currents.

* * * * *